United States Patent Office 3,488,395
Patented Jan. 6, 1970

3,488,395
OXIDATION PROCESS
George Wallace Hooper, Norton-on-Tees, England, assignor to Imperial Chemical Industries Limited, London, England, a corporation of Great Britain
No Drawing. Filed Sept. 28, 1966, Ser. No. 582,536
Claims priority, application Great Britain, Oct. 4, 1965, 41,992
Int. Cl. C07c 27/16, 39/00
U.S. Cl. 260—621                           15 Claims

ABSTRACT OF THE DISCLOSURE

There is provided a process for oxidising aromatic compounds, e.g., benzene, toluene, biphenyl and naphthalene to the corresponding phenol in which the aromatic compound is reacted with hydrogen peroxide at temperatures between 0 and 30° C. in the presence of a catalyst comprising at least one metal of Groups I-B and VIII of the Periodic Table, transition metal ions and a liquid reaction medium containing a carboxylic acid of up to 5 carbon atoms. Hydrogen perovide may be produced in situ in the process by reacting hydrogen and oxygen therein.

---

This is a continuation-in-part of Ser. No. 288,455, filed on June 17, 1963 and now U.S. Patent No. 3,361,533.

This invention relates to a process for oxidising aromatic hydrocarbons.

According to the invention there is provided a process for oxidising an aromatic hydrocarbon to the corresponding phenol in which an aromatic hydrocarbon is reacted with hydrogen peroxide in the presence of a catalyst comprising at least one metal of Groups I-B and VIII of the Periodic Table, transition metal ions and a liquid reaction medium containing a dissolved carboxylic acid.

The aromatic hydrocarbon may contain one benzene ring or a plurality of such rings linked or fused together. Thus for example the aromatic hydrocarbon may be benzene, biphenyl, or naphthalene. Further, the aromatic hydrocarbon may be an alkyl substituted aromatic hydrocarbon such as for example, toluene. The oxidation of benzene to phenol is an important embodiment of the process of the invention. Surprisingly it is found that in oxidising benzene under the conditions which characterise the invention the yield of phenol is much greater than that of polyhydroxylated benzenes, in contrast to the process when carried out in a substantially aqueous medium.

The hydrogen peroxide may be separately produced by the catalytic combination of hydrogen and oxygen using a catalyst comprising at least one metal of Groups I-B and VIII of the Periodic Table and the crude or purified solution of hydrogen peroxide, then passed to the oxidation process. However, the oxidation process of the invention is preferably carried out in the presence of hydrogen and hence it is preferred to combine the hydrogen peroxide production and aromatic hydrocarbon oxidation steps by forming the hydrogen peroxide in situ by the combination of hydrogen and oxygen over the same catalyst as used for the oxidation step.

The catalyst comprises at least one metal from Groups I-B or VIII of the Periodic Table for example, gold and the Group VIII noble metals preferably palladium, platinum, or rhodium. It is preferred that the metal is palladium, which may be alloyed or mixed with a minor proportion of one or more other metals, particularly gold or platinum. The metal may be used in colloidal form but preferably it is supported on a carrier, the metal preferably forming 1 to 10% of the total weight of the catalyst. The carrier may be for example a refractory oxide such as alumina, silica, silica-alumina, titanium dioxide, zirconium dioxide or beryllium oxide or it may be graphite or silicon carbide. It is preferred that the carrier is silica-alumina or silica gel having a specific surface area within the range 200 to 400 m.$^2$/g. The catalyst may be produced by impregnating a carrier with a solution prepared by dissolving a metal compound for example, palladium chloride, in the minimum amount of an acid such as dilute hydrochloric acid, drying and reducing the compound to metal by hydrogen at for example 50° to 400° C.

It is preferred that the proportion of carboxylic acid in the liquid reaction medium is at least 30%, more preferably at least 50% by volume. A very suitable proportion of carboxylic acid in the liquid reaction medium is 60% to 100% by volume. The remainder of the liquid reaction medium i.e. excluding reactants, may be water. Water formed during the oxidation process may be removed to maintain a high concentration of carboxylic acid in the liquid reaction medium. The use of a carboxylic acid in the reaction medium is particularly advantageous since carboxylic acids are not readily oxidised. A mixture of carboxylic acids can be used if desired.

Most desirably the carboxylic acid is miscible with water. Further, it is preferred that the carboxylic acid is a lower aliphatic mono-carboxylic acid containing up to 5 carbon atoms, such as formic, acetic or propionic acids. The preferred carboxylic acid is acetic acid.

The process according to the invention is preferably carried out in the presence of an acid which is stronger than acetic acid and which is used in a concentration within the range 0.01 N to 2 N. This acid may be the carboxylic acid used as the reaction medium provided that this carboxylic acid is stronger than acetic acid for example, if the carboxylic acid is a halogenated acetic acid. The acid may also be a mineral acid for example, sulphuric acid, nitric acid, phosphoric acid or a sulphonic acid and this embodiment of the invention is preferred when the carboxylic acid in the reaction medium is acetic acid or an acid not stronger than acetic acid. A mixture of acids may be used.

As previously stated it is preferred to provide the hydrogen peroxide by the combination of hydrogen with oxygen. For safety reasons it is desirable that the hydrogen and oxygen are diluted with an unreactive gas and hence the oxygen may very conveniently be supplied as air. The gas pressure may be atmospheric or superatmospheric. The partial pressure of hydrogen is conveniently within the range 2 to 500 atmospheres especially 10 to 100 atmospheres. The partial pressure of oxygen is preferably between 0.5 to 1 times that of hydrogen. The quantity of hydrogen used is preferably such as to keep a substantial proportion of the transition metal ions in a reduced valency state.

The temperature at which the process is operated is suitably within the range 0° to 30° C.

The transitional metal may be for example, iron, nickel, cerium, cobalt, manganese, vanadium and tin. It is preferred that the transition metal is iron. The transition metal is introduced into the reaction mixture in the form of an ionisable compound in which the metal is preferably cationic, although it may be anionic. It is preferred that the concentration of transition metal ions in the reaction mixture is at least 3.5 millimoles per litre, i.e. if the transition metal compound used is ferrous sulphate heptahydrate the reaction mixture should preferably contain at least 0.2 mg. per ml. of ferrous ion. The upper limit of the concentration of transition metal ions in the reaction mixture is set by the solubility of the particular transition metal compound used in the reaction mixture. Thus in the case of ferrous sulphate heptahydrate up to 5 mg. of ferrous ion per ml. of reaction mixture may be used.

While the process according to the invention may be carried out in a single liquid phase it is advantageous to carry out the process in such a way that separate organic and aqueous phases are present. In this way the phenol formed tends to accumulate in the organic liquid phase where it is protected from further oxidation. Higher conversions of aromatic hydrocarbon to the desired phenol are thus obtained.

EXAMPLE 1

Oxidation of benzene to phenol using hydrogen peroxide produced in situ (a) A reaction mixture consisting of 15 ml. glacial acetic acid, 5 ml. of 0.4 N sulphuric acid, 2 ml. of benzene, 20 mg. of ferrous sulphate heptahydrate and 0.2 g. of finely divided palladium (5%) on silica-gel catalyst was made up in a glass lined autoclave. A mixture of hydrogen (9%), oxygen (5%) and nitrogen (86%) was then pumped in to give a pressure of 2000 p.s.i.g. and the solution was stirred vigorously at 20° C. After 30 minutes 243 mg. of phenol and 14.2 mg. hydroquinone had been produced. (b) The above run was repeated but using 4 ml. of benzene instead of 2 ml. The quantity of phenol produced in 30 minutes was 322 mg. and of hydroquinone 18.5 mg.

(c) When run (a) was repeated using water in place of the acetic acid the quantity of phenol produced was only 43.5 mg. while the quantity of hydroquinone produced was 35.5 mg.

EXAMPLE 2

75 ml. glacial acetic acid, 25 ml. 0.4 N sulphuric acid, 10 ml. benzene, 1.0 g. of a finely-divided palladium on silica-gel catalyst containing 5% palladium and $36 \times 10^{-5}$ gram ions of a transition metal in the form of a metal compound were mixed together in a glass-lined autoclave. The transition metals and compounds used are listed in the following table.

A mixture of 60% hydrogen and 40% oxygen by volume was then introduced into the autoclave at atmospheric pressure and the reaction mixture vigorously stirred at 20° C. After 120 minutes the reaction mixture contained the amounts of phenol shown in the table:

| Transition metal | Transition metal compound | Products, mg. | |
|---|---|---|---|
| | | Phenol | Polyhydroxy phenols |
| Fe | FeSO$_4$ | 740 | 60 |
| Ce | CeCl$_3$ | 430 | 20 |
| Co | CoSO$_4$ | 380 | 20 |
| Ni | NiSO$_4$ | 440 | 30 |
| Mn | MnSO$_4$ | 360 | ND |
| V | VOSO$_4$ | 340 | ND |
| Sn | SnCl$_2$ | 280 | ND |
| Pb | PbAC$_2$ | 175 | ND |
| Tl | TlNO$_3$ | 140 | ND |
| Ti | Ti$_2$(SO$_4$)$_3$ | 90 | ND |

ND=Not determined.

EXAMPLE 3

Process using hydrogen peroxide not made in situ

To 110 ml. of a reaction mixture made up in the same proportions as in Example 1(a) there were added 10 ml. of 100 vol. hydrogen peroxide and the liquid was vigorously stirred under an atmosphere of hydrogen. In 2 hours, 520 mg. of phenol and 20 mg. quinol were produced.

When the same reaction was carried out under an atmosphere of air instead of hydrogen only 27 mg. of phenol and no quinol were produced in 2 hours.

EXAMPLE 4

An equimolecular mixture of gaseous hydrogen and oxygen at atmospheric pressure was passed at room temperature into a vigorously-stirred solution consisting of 100 ml. of 99% acetic acid, 2 g. of naphthalene and 50 mg. of titanium trichloride, in which was suspended 2 g. of a finely-divided catalyst consisting of palladium (5%) on silica-gel. After 5 hours reaction, 225 mg. of alpha-naphthol were produced.

EXAMPLE 5

The experiment described in Example 1(a) was repeated except that the palladium in the catalyst was replaced by platinum, rhodium or ruthenium.

The results obtained were as follows:

| Catalyst | Products, mg. | |
|---|---|---|
| | Phenol | Quinol |
| Pt | 350 | 36 |
| Rh | 260 | 13 |
| Ru | 20 | ND |

ND=Not determined.

EXAMPLE 6

The experiment described in Example 1(e) was repeated except that toluene was oxidised instead of benzene and in run 2, the palladium in the catalyst was replaced by platinum. The results obtained were as follows:

| Run No | 1 | 2 |
|---|---|---|
| Catalyst | Pd | Pt |
| Products mg: | | |
| o-Cresol | 26 | 9 |
| p-Cresol | 24 | 9 |
| m-Cresol | 7 | 4 |
| Benzaldehyde | 26 | 88 |
| Benzyl alcohol | 77 | 23 |

EXAMPLE 7

The experiment described in Example 1(a) was repeated except that the acetic acid was replaced by propionic acid. 224 mg. phenol and 15 mg. quinol were produced.

EXAMPLE 8

83 ml. glacial acetic acid, 25 ml. 0.4 N sulphuric acid, 72 ml. benzene, 180 mg. ferrous sulphate heptahydrate and 0.2 g. of a finely-divided palladium on silica-gel catalyst containing 5% palladium were mixed together in a glass-lined autoclave and a gaseous mixture containing by volume 9% hydrogen, 5% oxygen and 86% nitrogen introduced into the autoclave to give a pressure of 2000 p.s.i.g. The mixture was stirred at 20° C. for 30 minutes and the benzene layer then separated from the aqueous layer. The benzene layer contained 370 mg. phenol and no detectable amount of quinol while the aqueous layer contained 590 mg. phenol and 64 mg. quinol.

1. A process for oxidising an aromatic hydrocarbon selected from the group consisting of benzene, toluene, biphenyl and naphthalene to the corresponding phenol in which an aromatic hydrocarbon is reacted with hydrogen peroxide at a temperature within the range of 0° to 30° C. in the presence of a catalyst comprising at least one metal of Groups I–B and VIII of the Periodic Table, at least 3.5 millimoles per liter of transition metal ions and a liquid reaction medium consisting essentially of at least 30% by volume of a dissolved alkanoic acid containing up to 5 carbon atoms and water.

2. A process as claimed in claim 1 in which the hydrogen peroxide is formed in situ by reaction between hydrogen and oxygen and wherein the partial pressure of hydrogen is within the range 2 to 500 atmospheres and wherein the partial pressure of oxygen is within the range 0.5 to 1 times the partial pressure of hydrogen.

3. A process as claimed in claim 1 in which hydrogen gas is present.

4. A process as claimed in claim 1 in which the catalyst comprises a noble metal of Group VIII of the Periodic Table.

5. A process as claimed in claim 4 in which the noble metal is palladium.

6. A process as claimed in claim 1 in which the catalyst comprises a carrier for the metal.

7. A process as claimed in claim 6 in which the carrier is selected from the group consisting of silica-alumina and silica-gel.

8. A process as claimed in claim 6 in which the catalyst contains 1 to 10% by weight of metal.

9. A process as claimed in claim 1 in which the liquid reaction medium contains at least 50% by volume of alkanoic acid.

10. A process as claimed in claim 1 in which the alkanoic acid is acetic acid.

11. A process as claimed in claim 1 in which an acid stronger than acetic acid is present in the reaction medium.

12. A process as claimed in claim 11 in which the acid is a mineral acid.

13. A process as claimed in claim 1 in which the transition metal is iron.

14. A process as claimed in claim 1 in which the reaction mixture comprises separate organic and aqueous phases.

15. A process as claimed in claim 1 in which the aromatic hydrocarbon is benzene.

References Cited

FOREIGN PATENTS 1,366,253   6/1964   France.

LEON ZITVER, Primary Examiner

N. P. MORGENSTERN, Assistant Examiner

U.S. Cl. X.R.

260—599, 618, 620